Sept. 18, 1934.  P. L. MORRIS  1,974,342
SPRING TOOTH FOR PEANUT PICKERS
Filed Feb. 25, 1931
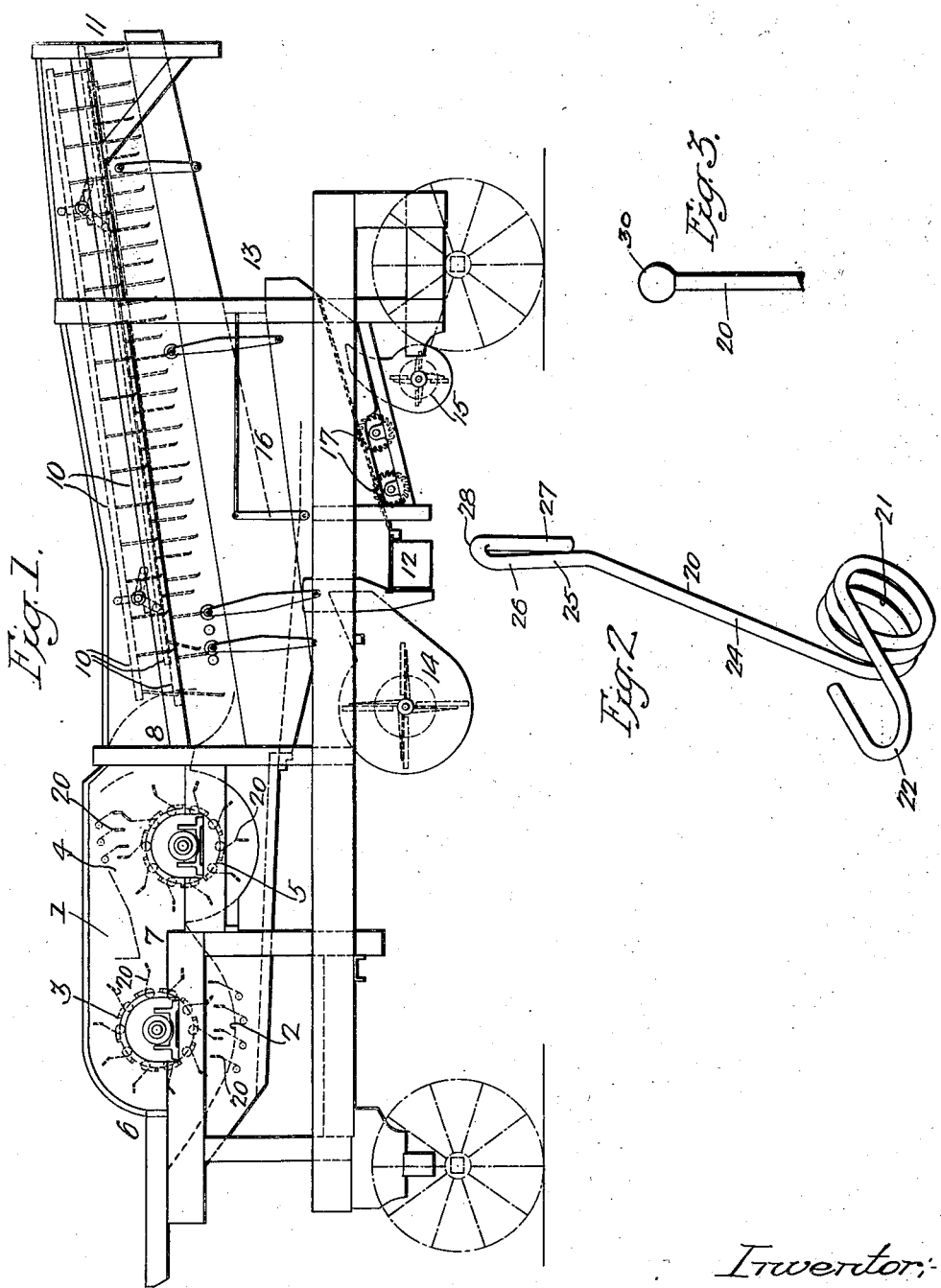

Patented Sept. 18, 1934

1,974,342

UNITED STATES PATENT OFFICE 1,974,342

SPRING TOOTH FOR PEANUT PICKERS

Paul L. Morris, Pottstown, Pa.

Application February 25, 1931, Serial No. 518,223

3 Claims. (Cl. 130—30)

This invention relates to peanut picking machines and particularly to the fingers or teeth used in the concaves and cylinders between which the peanut vines, with the peanuts thereon, are initially inserted, to tear the vines apart, for facilitating the removal of the peanuts from the vines by other elements of the picker which subsequently operate on the mass for that purpose.

Peanut pickers, or threshers, as originally built were provided with rigid fingers or teeth on the concaves and the co-operating cylinders. Such rigid teeth had the tendency to crush or crack a high percentage of the peanuts.

The price obtainable by the planters for their product, depends, to a great extent, upon the percentage of broken or cracked peanuts in the mass, therefore, experiments were carried on with a view of reducing the percentage of mutilated peanuts per bushel.

As a result of these experiments resilient fingers or teeth were provided so that if thickly matted masses of vines were encountered these teeth would yield to some extent and thereby reduce the compression in the mass which previously had caused considerable of the mutilation.

These resilient teeth eventually evolved into the form of a piece of spring wire cut from a bar and bent into a coil at one end, which was anchored in the concave or cylinder, leaving the opposite end extending outward from the coil to form a spring tooth.

While this improvement materially reduced the percentage of mutilates the percentage still remained higher than desired.

Subsequent experiments have disclosed that a large number of the mutilates were caused by the rough cut outer ends of the spring teeth catching in the crevices found in the outer surfaces of the shells of the peanuts and puncturing the peanuts.

The object of this invention is to form the outer ends of the spring teeth of peanut picking machines in such a manner as to prevent their catching in the crevices of the peanut shells so that the puncturing of the shells will be eliminated or reduced to a considerable extent.

The construction of the tooth or finger constituting the subject of the present invention will be fully disclosed hereinafter, reference being had to the accompanying drawing, of which:

Fig. 1 is a side elevation of a conventional form of peanut picking machine showing the present invention as applied thereto;

Fig. 2 is a perspective view of a spring tooth made in accordance with the present invention; and Fig. 3 illustrates one modified form of the invention.

The machine, shown in Fig. 1, comprises a threshing head 1 into which the peanut vines are initially inserted. The vine-receiving section 1 of the machine comprises an initial concave 2 and a cylinder 3 co-operating therewith; and a supplemental concave 4 and cylinder 5 co-operating with the concave 4.

The peanut vines, as pulled in the field, enter the head 1, at 6, passing between the concave 2 and co-operating cylinder 3, thence through a channel 7 to and between the concave 4 and its co-operating cylinder 5, being delivered through a channel 8, which communicates with a separating and clearing chamber 9. In the chamber 9 is provided a plurality of relatively movable rakes 10, 10, which complete the tearing of the vines and the separation of the peanuts therefrom, the vines being discharged from the machine as at 11 and the cleaned peanuts being discharged as at 12, while the small particles of vines, dust and other refuse are discharged at 13 by air currents set up in the cleaning chamber by the main blower fan 14 and booster fan 15 which create suitable currents of air in the clearing chamber 16. The short stems of the peanuts are removed from the peanuts by the usual form of toothed discs 17, 17.

The concaves 2 and 4 and the cylinders 3 and 5 are each, in the present instance, provided with spring teeth, such as illustrated at 20 in Figs. 1 and 2.

Each tooth 20 comprises a coiled section 21, at one end of which is formed an eye 22 for the reception of a bolt or screw by which the tooth or finger is secured in place.

From the opposite end of the coil 21 extends the finger proper, as illustrated at 24. Adjacent its outer end, the finger 24 is bent at an angle to provide a vine-engaging portion 25.

As illustrated in Fig. 2, the extreme outer end 26 of the vine-engaging portion 25 of the finger or tooth 20 is bent backwardly upon, and is disposed in the plane of rotation of the outer end 25 of the finger, as illustrated at 27, thus providing a rounded end 28 on the finger or tooth which will not catch in the crevices of the peanut shells but will slide over or past the shells without puncturing or otherwise mutilating the shells of the peanuts.

While the bending of the outer ends of the teeth backwardly to provide the rounded ends 28 on the teeth effectively reduces the puncturing and other mutilation of the peanuts it does not materially increase the cost of the machine, and while the preferred form of rounded end has been shown obviously other methods of rounding the ends of the teeth may be resorted to, without departing from the spirit of the invention, for example, a ball end 30, as shown in Fig. 3, may be provided for the purpose.

I claim:

1. In a peanut picking machine, an inherently resilient finger composed of round spring stock having a rounded end for engagement with peanut-laden vines placed in the machine, said rounded end being formed by bending said stock backwardly upon the finger.

2. In a peanut picking machine, an inherently resilient finger composed of round spring stock having a rounded end for engagement with peanut-laden vines placed in the machine, said rounded end being formed by bending said stock backwardly upon the finger in the longitudinal plane of the finger.

3. A resilient finger, for use in a peanut picking machine on at least one of a co-operating pair of relatively movable elements for removing peanuts from vine masses placed in the machine, said finger being composed of round spring stock and having a portion of its outer vine-engaging end bent inwardly upon the finger in the plane of relative movement between the said finger-carrying elements to provide a rounded end on said finger to reduce mutilation of the peanuts engaged thereby.

PAUL L. MORRIS.